United States Patent
Knoerzer et al.

(10) Patent No.: US 7,189,300 B2
(45) Date of Patent: Mar. 13, 2007

(54) FLEXIBLE FILM PACKAGING HAVING REMOVABLE STRIP

(75) Inventors: Anthony Robert Knoerzer, Plano, TX (US); Garrett William Kohl, Allen, TX (US); Steven Kenneth Tucker, Hurst, TX (US)

(73) Assignee: Frito-Lay North America, Inc., Plano, TX (US)

(*) Notice: Subject to any disclaimer, the term of this patent is extended or adjusted under 35 U.S.C. 154(b) by 51 days.

(21) Appl. No.: 10/685,186

(22) Filed: Oct. 14, 2003

(65) Prior Publication Data

US 2005/0079322 A1   Apr. 14, 2005

(51) Int. Cl.
*B32B 37/22*   (2006.01)
*B32B 38/04*   (2006.01)
*B29C 65/02*   (2006.01)

(52) U.S. Cl. ............... 156/256; 156/271; 156/289; 156/324

(58) Field of Classification Search ............... 156/247, 156/250, 254, 256, 258, 259, 263–265, 269, 156/271, 289, 324, 257; 428/44, 47, 48, 428/42.2–42.3, 43, 34.1, 34.3, 35.2; 283/100, 283/101, 103, 104
See application file for complete search history.

(56) References Cited

U.S. PATENT DOCUMENTS

| | | | |
|---|---|---|---|
| 2,391,539 A * | 12/1945 | Avery | 156/259 |
| 3,110,121 A | 11/1963 | Corrinet | |
| 3,879,246 A * | 4/1975 | Walker | 156/265 |
| 4,256,791 A * | 3/1981 | Holmstrom et al. | 428/77 |
| 4,308,679 A | 1/1982 | Ray, III et al. | |
| 4,324,823 A | 4/1982 | Ray, III | |
| 5,127,743 A | 7/1992 | Miller et al. | |
| 5,536,546 A * | 7/1996 | Nash | 428/43 |
| 6,206,570 B1 * | 3/2001 | Cortopassi | 383/127 |
| 6,267,243 B1 | 7/2001 | Sumpmann et al. | |
| 6,383,592 B1 | 5/2002 | Lowry et al. | |
| 6,417,308 B2 | 7/2002 | Arai et al. | |

FOREIGN PATENT DOCUMENTS

GB   1399922 A * 7/1975
JP   62062736 A * 3/1987

OTHER PUBLICATIONS

English Abstract of JP 62-63736.*

* cited by examiner

*Primary Examiner*—Chris Fiorilla
*Assistant Examiner*—Chan Sing Po
(74) *Attorney, Agent, or Firm*—Carstens & Cahoon, LLP; Colin P. Cahoon; Chad E. Walter (57) ABSTRACT

Slitters cut through a first layer of film immediately prior to lamination of the first layer to a second layer of film to form a strip therebetween. The degree of bonding between the first and second layers is adjusted so that the strip can be removed without harming the rest of the film or destroying any barrier properties. The lamination process can utilize extrusion lamination or adhesive lamination to provide a variety of uses: removable coupons, prize disclosures, stickers, and an adhesive re-close strip.

5 Claims, 7 Drawing Sheets

FLEXIBLE FILM PACKAGING HAVING REMOVABLE STRIP

BACKGROUND OF THE INVENTION

1. Technical Field

The present invention relates to a flexible packaging material that can be used in packaging food products and to a method of making the packaging material. More specifically it relates to forming a removable strip that is cut from one or more layers and can be removed without harming the rest of the packaging material. Even more specifically, the present invention relates to using a removable strip of the packaging material to provide removable promotional material (with or without the promotional material being visible prior to removal of the strip), removable stickers, or an adhesive area for re-closing the package.

2. Description of Related Art

Snack foods and other items are often packaged in bags formed from thin, flexible packaging films. These thin films are formed primarily of plastics, such as polypropylene and polyethylene, but can also contain metalized films, foil, paper, or oriented films. These packaging films can have numerous layers directed to achieving specific needs, but are generally formed at least in part by extrusion of a plastic layer, co-extrusion of multiple layers simultaneously, extrusion coating of another material (such as paper), and the lamination of two layers together via either extrusion lamination or adhesive lamination. In the discussions below, both extrusion lamination and adhesive lamination processes are discussed in more detail, but it is noted that any designated layer that is fed into these two processes can already be a multi-layer film formed by any of the above processes.

Figure 1:
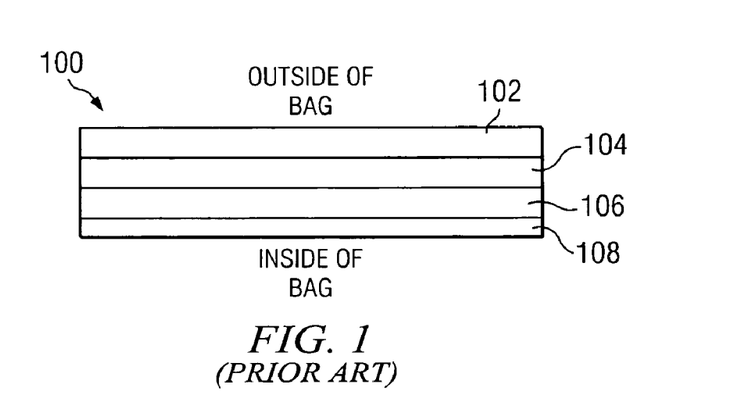
FIG. 1 depicts a cross-section of an exemplary prior art packaging film.

An exemplary film 100 for packaging of food products is seen in FIG. 1. The outermost layer 102 is an OPP layer, short for oriented polypropylene, while the innermost layer 106 is a metalized OPP. An oriented polymer material has been specially treated so that the long polymeric molecules tend to align in a given direction, causing the material to preferentially tear in that direction. Sandwiched between the two OPP layers 102, 106 is a layer of polyethylene 104, formed as the two OPP layers are extrusion laminated together. Printing for the package is done on the inside of the outer layer and becomes sandwiched between the middle and outer layers. The innermost, metallic layer 106 can itself be a layered laminate and contains a sealant layer 108 on what will be the inside of the package. This sealant layer is formed of a ter-polymer, composed of ethylene, propylene, and butylenes, and provides a barrier to retain taste and freshness. Other materials used in packaging are polyester, paper, polyolefin extrusions, adhesive laminates, and other such materials, or a layered combination of the above.

Figure 2:
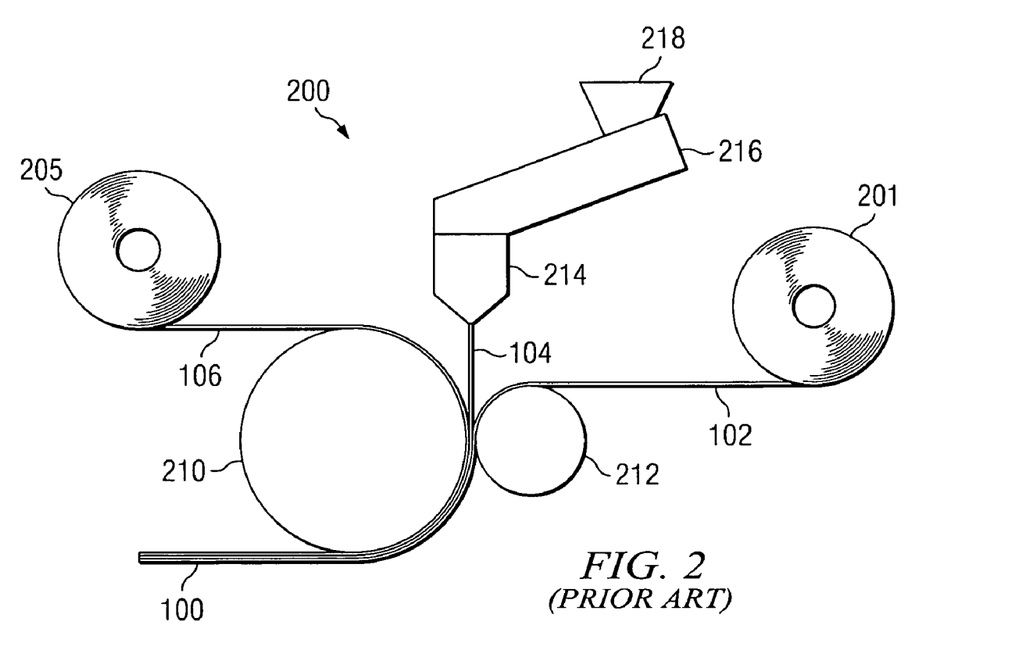
FIG. 2 depicts the exemplary formation of a prior art packaging film.

FIG. 2 demonstrates schematically the formation of material 100, in which the OPP layers 102, 106 of the packaging material are separately manufactured, then formed into the final material 100 on an extrusion laminator 200. OPP layer 102 is fed from roll 201 while OPP layer 106 is fed from roll 205. At the same time, resin for PE laminate layer 104 is fed into hopper 218 and through extruder 216, where it will be heated to approximately 600° F. and extruded at die 214 as molten polyethylene 104. This molten polyethylene 104 is extruded at a rate that is congruent with the rate at which the OPP materials 102, 106 are fed, becoming sandwiched between these two materials. The layered material 100 then runs between chill drum 210 and nip roller 212, ensuring that it forms an even layer as it is cooled. The pressure between the laminator rollers is generally set in the range of 0.5 to 5 pounds per linear inch across the width of the material. The large chill drum 210 is made of stainless steel and is cooled to about 50–60° F., so that while the material is cooled quickly, no condensation is allowed to form. The smaller nip roller 212 is generally formed of rubber or another resilient material. The nip roller 212 wears out fairly quickly and is regularly replaced, while the chill drum 210 is changed much less frequently. Note that the layered material 100 remains in contact with the chill drum 210 for a period of time after it has passed through the rollers, to allow time for the resin to cool sufficiently. The material can then be wound into rolls (not specifically shown) for transport to the location where it will be used in packaging. Generally, it is economical to form the material as wide sheets that are then slit using thin slitter knives into the desired width as the material is rolled for shipping.

Figure 3:
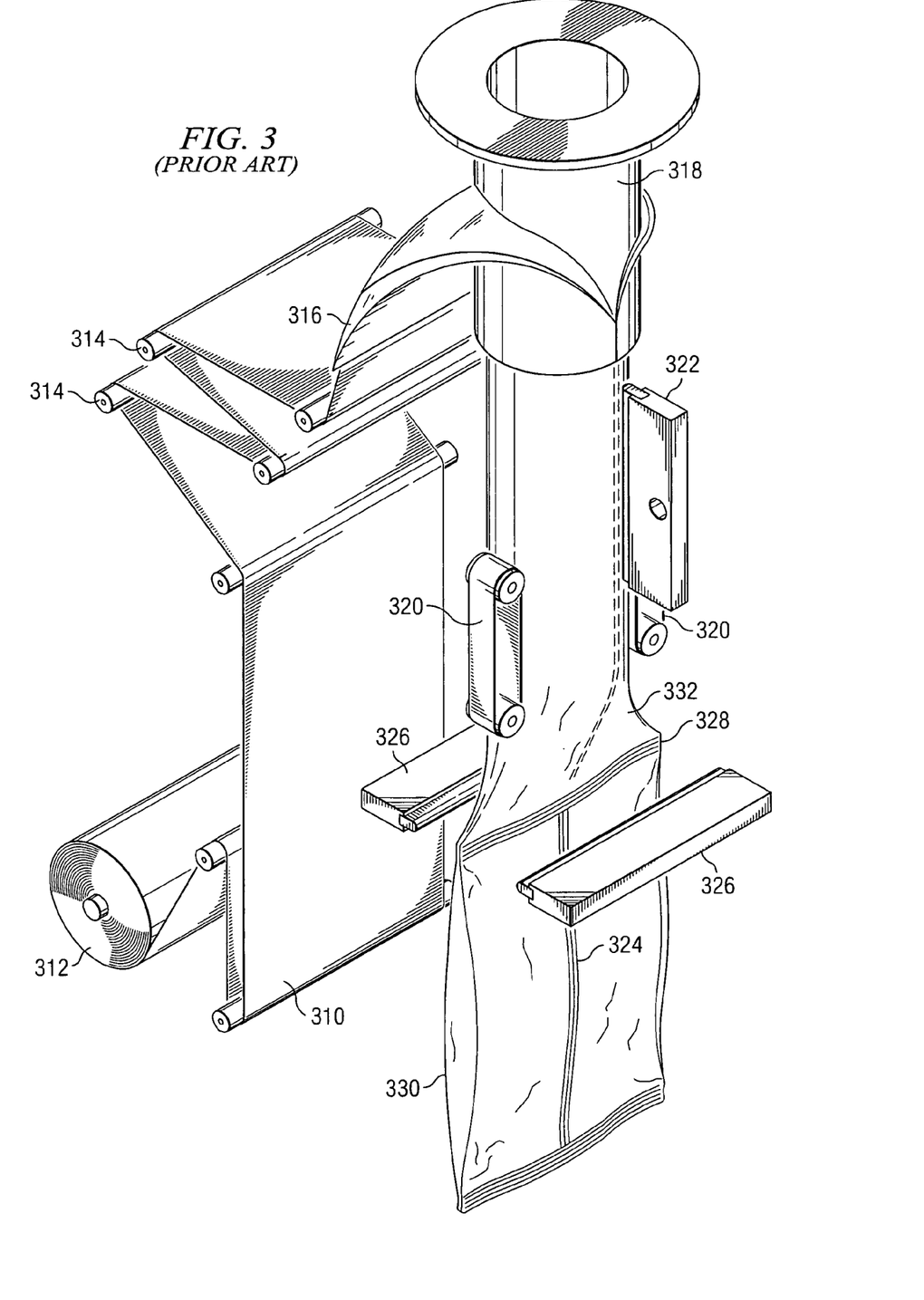
FIG. 3 depicts a vertical form, fill, and seal machine that is known in the prior art.

Once the material is formed and cut into desired widths, it can be loaded into a vertical form, fill, and seal machine to be used in packaging the many products that are packaged using this method. FIG. 3 shows an exemplary vertical form, fill, and seal machine that can be used to package snack foods, such as chips. This drawing is simplified, and does not show the cabinet and support structures that typically surround such a machine, but it demonstrates the working of the machine well. Packaging film 310 is taken from a roll 312 of film and passed through tensioners 314 that keep it taut. The film then passes over a former 316, which directs the film as it forms a vertical tube around a product delivery cylinder 318. This product delivery cylinder 318 normally has either a round or a somewhat oval cross-section. As the tube of packaging material is pulled downward by drive belts 320, the edges of the film are sealed along its length by a vertical sealer 322, forming a back seal 324. The machine then applies a pair of heat-sealing jaws 326 against the tube to form a transverse seal 328. This transverse seal 328 acts as the top seal on the bag 330 below the sealing jaws 326 and the bottom seal on the bag 332 being filled and formed above the jaws 326. After the transverse seal 328 has been formed, a cut is made across the sealed area to separate the finished bag 330 below the seal 328 from the partially completed bag 332 above the seal. The film tube is then pushed downward to draw out another package length. Before the sealing jaws form each transverse seal, the product to be packaged is dropped through the product delivery cylinder 318 and is held within the tube above the transverse seal 328.

The form, fill, and seal machines are quite expensive, in the range of $250,000 each, but pay for themselves easily when compared to the cost of pre-formed bags and the machinery to fill them. However, in order to maximize the productivity of the form, fill, and seal machines, it is common for the product delivery tube 318 and former 316 to be made as a unit that is easily interchangeable, so that different size packages can be made by the same machine. The length of the transverse seal can also be changed, by exchanging the sealing jaws 326, or in some cases, merely by exchanging their facings (the portion of the sealing jaws which actually makes contact with the packaging film). By changing these elements, as well as the width of film roll feeding into the machine and the programming of the machine, one form, fill, and seal machine can handle a number of different products in different size packages, limited primarily by the width of film the machine will handle, the maximum length of bag the machine is designed to handle, and the available former/delivery tube assemblies.

Although there is no one perfect package for all uses, there are a number of desirable features that manufacturers have long desired to include in packages made on a vertical form, fill, and seal machine. One exemplary feature is the ability to re-close a package of a snack food that is only partially eaten, so that the flavor and texture of the product are preserved as long as possible. High quality reclosable seals, also known as zipper seals, have been introduced in recent times, but these add significantly to the cost of making the bag. It would be desirable to have a low-cost alternative.

Similarly, it can be desirable to include promotional material with a bag of snack food, such as prize announcements, coupons, stickers, or informational graphics. Including such information inside the package can be a problem, however, as the ink and solvent levels in fatty food packages are regulated to insure product safety. If promotional material is included inside the package, it must be enclosed in an impermeable film, which adds to the cost. Dropping promotional material into the package also creates problems, as it may interfere with the normal flow of product and can set off foreign object detectors, costing time. The promotional material can alternatively be provided as part of the graphics seen on the outside of the package, but detachment of the material from the package is not possible without destroying the package itself, so the product must be gone before the promotional material can be removed.

In summary, two desirable options for flexible packaging are currently unavailable: a low-cost re-closing mechanism and the ability to provide promotional material that can be removed without destroying the package.

SUMMARY OF THE INVENTION

Two slitters are placed immediately prior to a laminator that laminates the inner and outer layers of a packaging film together. The outer layer of the packaging film is cut completely through by the slitters, so that a strip of the outer layer is no longer connected to the rest of the layer. Because the slitters are placed very close to the lamination rollers, the entire outer film remains in alignment as it is laminated to the inner film, with only fine score lines apparent to show that the slitting has been performed. By adjusting the bond between the outer layer and the inner layer, the strip can be peeled away from the rest of the film without injuring the barrier layer that is part of the inner loop. Foods packaged with the film are not affected by the removal of the strip. Applicants demonstrate two uses for this removable strip: 1) promotional material, such as coupons or prize notifications can be printed on the material such that they are not visible until the strip is peeled and 2) an adhesive layer concealed beneath the removable strip can serve as a closure for a partially full bag.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 4b depicts the formation of the packaging film of FIG. 4a.

FIG. 5 depicts a printed roll of packaging film containing a removable strip, according to the embodiment of FIG. 4a.

FIG. 7b depicts the formation of the packaging film of FIG. 7a.

FIG. 8 depicts a printed roll of packaging film containing a removable strip, according to the embodiment of FIG. 7a.

DETAILED DESCRIPTION

Several embodiments of the innovative invention will now be described with reference to the drawings.

Figure 4A:
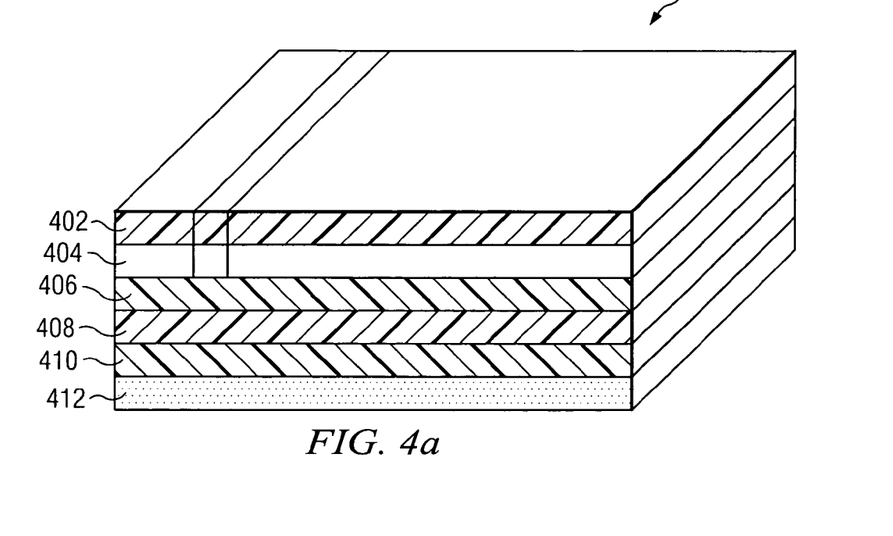
FIG. 4a depicts a magnified cross-section of a packaging film made according to an exemplary embodiment of the invention.

FIG. 4A demonstrates a typical multi-layer packaging film 400 used in a first embodiment of the innovative process. The top layer 402 of the film, as shown in the drawing, will become the outermost layer of the final package, while the bottom layer 412 will become the innermost layer. Notably, any reference in this application to top or bottom layers refers to the orientation in the drawing and any reference to inner or outer layers refer to the film as it will be put together into a finished bag. The outermost layer 402 of this film consists of a clear layer of an oriented polypropylene (OPP). The next layer is the package graphics 404. Although this is shown in the figure as a continuous layer, this layer is the ink design printed onto the OPP layer and may or may not be continuous. The graphics layer 404 is applied in reverse to the inside of the OPP layer 402, so that in the finished package, the graphics layer 404 is seen in a proper orientation through the clear OPP layer 402. The ink can itself be applied in layers to form complex graphics. Underneath the graphics layer 404 is a clear layer of a low-bond polyethylene 406, followed by another layer of oriented polypropylene 408, a white, high-bond polyethylene layer 410 and a barrier web 412 that serves as a barrier to any materials, such as oils, printing ink, or oxygen, that might otherwise pass between the contents and the outside world. The outer two layers 402, 404 have been completely cut through prior to bonding to the underlying layers. The strength with which these two layers bond to the underlying layers is determined largely by the thickness of the polyethylene layer 406. This thickness is determined by the rate at which the polyethylene is extruded during the lamination step and can be determined by setting a dial on the extruder. Typical laminations for a film used to package snack foods would provide 75 grams of adhesion, while at least 5 grams of adhesion is necessary for the lamination to hold. Between these two figures, the specific level of adhesion would be dependent on the desired ease of removal and can be determined by one of ordinary skill in the art.

Figure 4B:
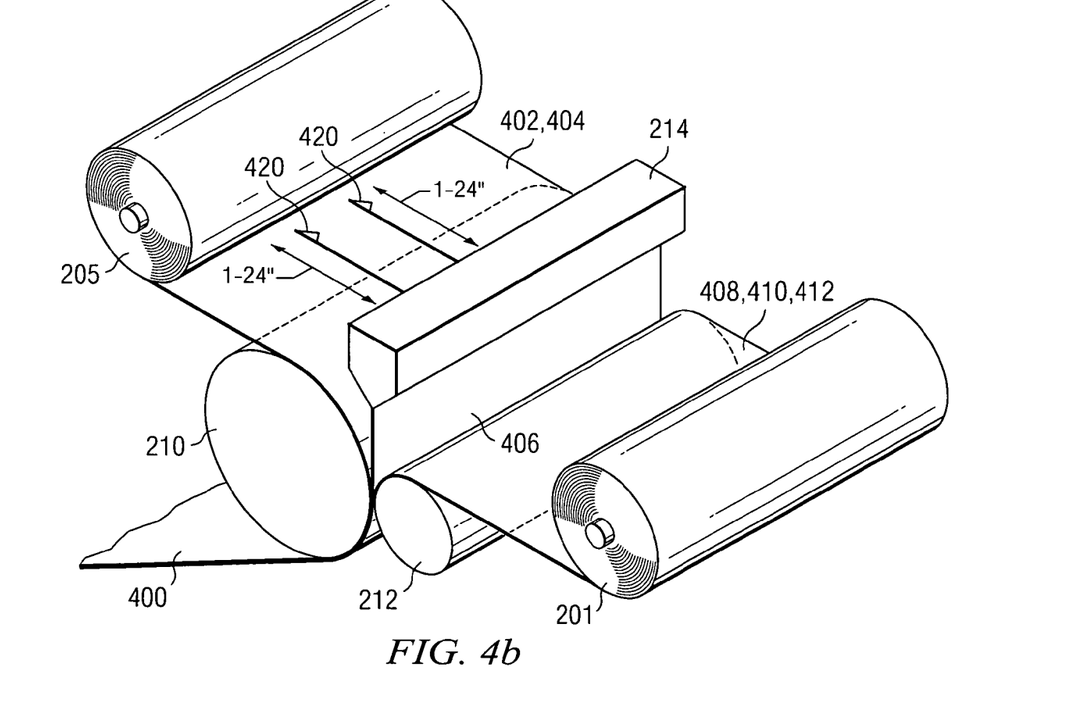

FIG. 4B demonstrates the process of making this layered packaging film. This drawing is a three dimensional version of the process shown in FIG. 2; identical numbers represent identical structures. In FIG. 4B, as the outer layer, comprising the OPP 402 and graphics 404 layers, is fed into the laminator, slitters 420 are placed so that they completely cut through the outer layer 206 of material. In previous attempts to slit a layer prior to lamination, it has been extremely difficult to get the slit material to maintain its relative position as it moves through the laminator, so that there are neither gaps nor overlapping material in the slit. In prior art applications, rather than slitting the layer completely in two, the slitters would be adjusted to only cut partially through the layer. In order to reliably cut through the material without creating problems, two considerations are important: 1) the slitters must be oriented so that the plane of the slitter is perpendicular to the plane of the material being slit, with the cutting edge facing the oncoming material squarely, and 2) the slitters must be placed within one to twenty-four (1–24) inches of the laminator nip roller. If these precautions are not observed, the cut film can move unnecessarily, causing overlapping with adjacent pieces or else allowing open spaces between adjacent pieces of film.

Figure 5:
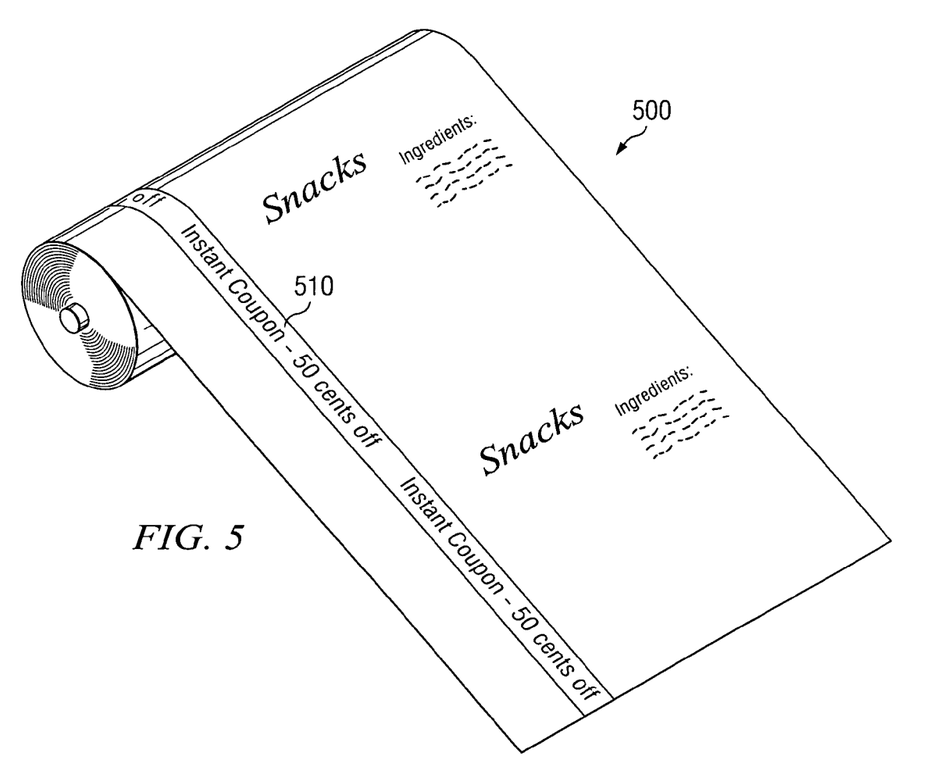
Figure 6A:
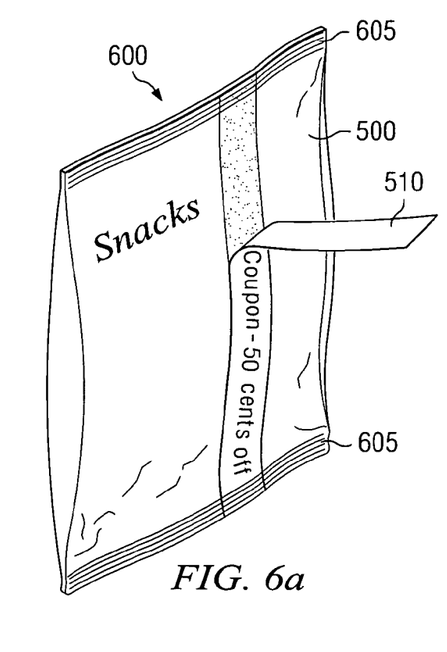
FIG. 6a depicts a filled package of snacks made from the film of FIG. 5, according to an exemplary embodiment of the invention.

FIG. 5 shows an exemplary roll of packaging film 500 that has been made using the method described above. In this embodiment, the removable strip 510 has been printed with a coupon, redeemable on purchase. FIG. 6a shows this same film after it has been made into a pouch package 600 containing a snack food. As is usual, the transverse seals 605 formed by seal jaws 326 run across the top and bottom of bag 600. To redeem the coupon, the consumer can peel the coupon off from the package for redemption. The removal of the coupon strip 510 can typically be started with a fingernail or thin instrument from the end of the package, since the adhesion of the outer layer to the inner layer has been adjusted accordingly. However, it should be noted that even with the coupon removed, there has been no destruction of the barrier properties of the packaging film, as the underlying barrier layer is still intact.

Figure 6B:
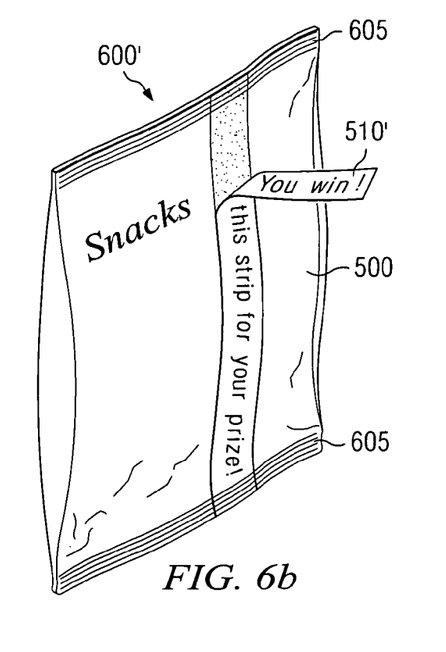
FIG. 6b depicts a filled package of snacks, made according to an alternate embodiment of the invention.

In a simple variation on the above embodiment, shown in FIG. 6b, the graphics layer can include an opaque area with additional printing on the underside of the opaque area, so that the printing can only be read after the strip has been removed from the package 600'. This would allow the strip 510' to be used as a contest piece or prize notification, with its removal causing no harm to the packaging.

Figure 7A:
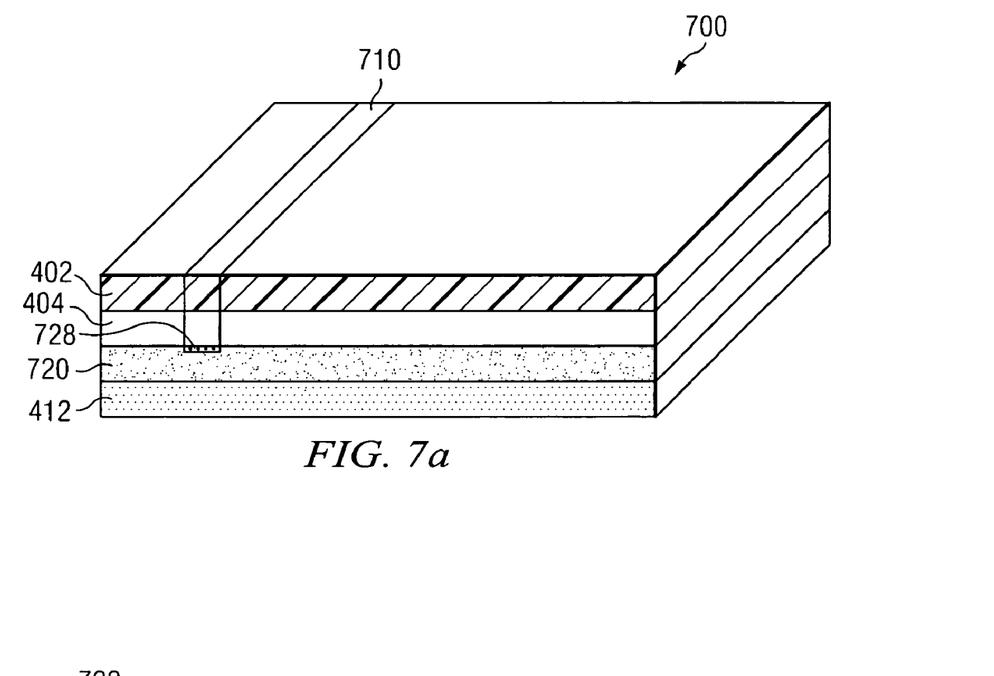
FIG. 7a depicts a magnified cross-section of a packaging film made according to an exemplary embodiment of the invention.

FIG. 7a shows an exemplary layered packaging material 700 that can be used in an alternate embodiment of the invention. This material does not have as many layers as the previous example and is made by adhesion lamination, rather than extrusion lamination. Three of the layers, the oriented polypropylene 402, package graphics 404, and barrier web 412 are the same as previously used, but they are laminated together by a layer of adhesive 720. A release coating 728 has been placed between the graphics layer 404 and the adhesive 720 in the region of the removable strip 710.

Figure 7B:
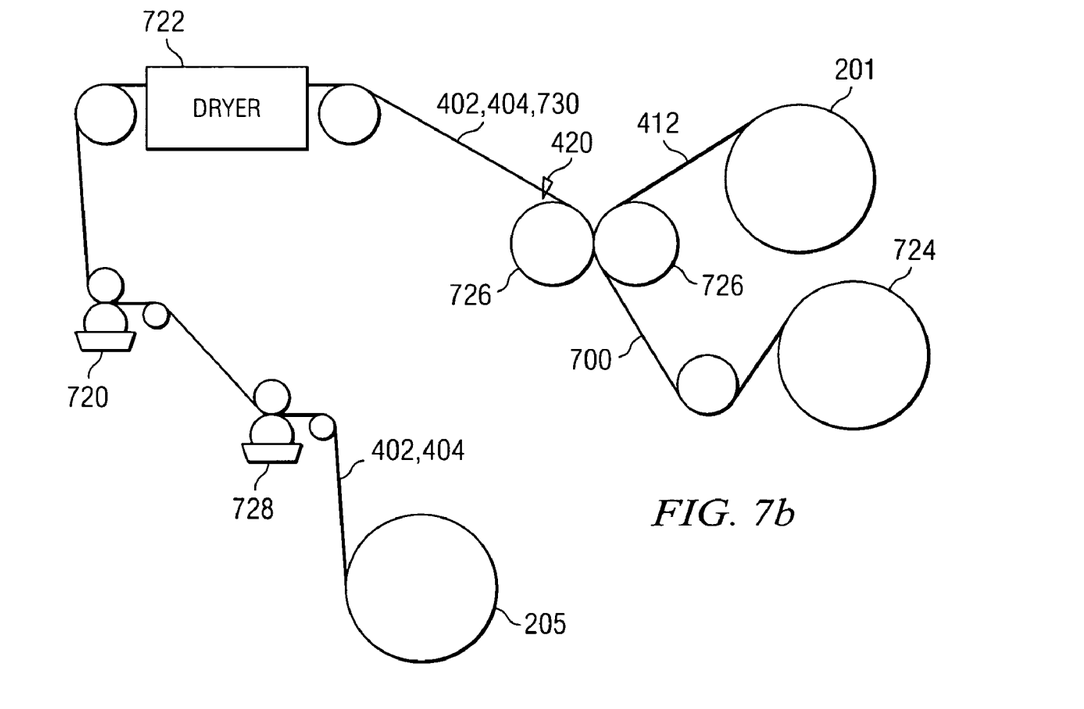

FIG. 7b demonstrates schematically the process of making the layered adhesive laminate of FIG. 7a. A first input roll 205 carries the outer layer containing the OPP 402 and graphics layer 404, while input roll 201 carries the inner layer containing barrier web 412. As the outer layer 402, 404 unrolls, it first passes a pair of rollers where the section of the film that will form the removable strip is coated with a release coating 728. At the next set of rollers, the entire width of the film is coated with an adhesive 720, then the film moves through a dryer 722 until the adhesive 720 is dry. The reason for the release coating will become clear below. This outer layer, which contains OPP 402, graphics 404, a partial release coating 728, and an adhesive coating, 730, is laminated to the barrier web 412 as they pass through rollers 726. Just prior to lamination, two slitters 420 slit the outer layer to form the removable strip 710. The finished film 700 is then re-rolled on output roll 724 for distribution and use.

Figure 8:
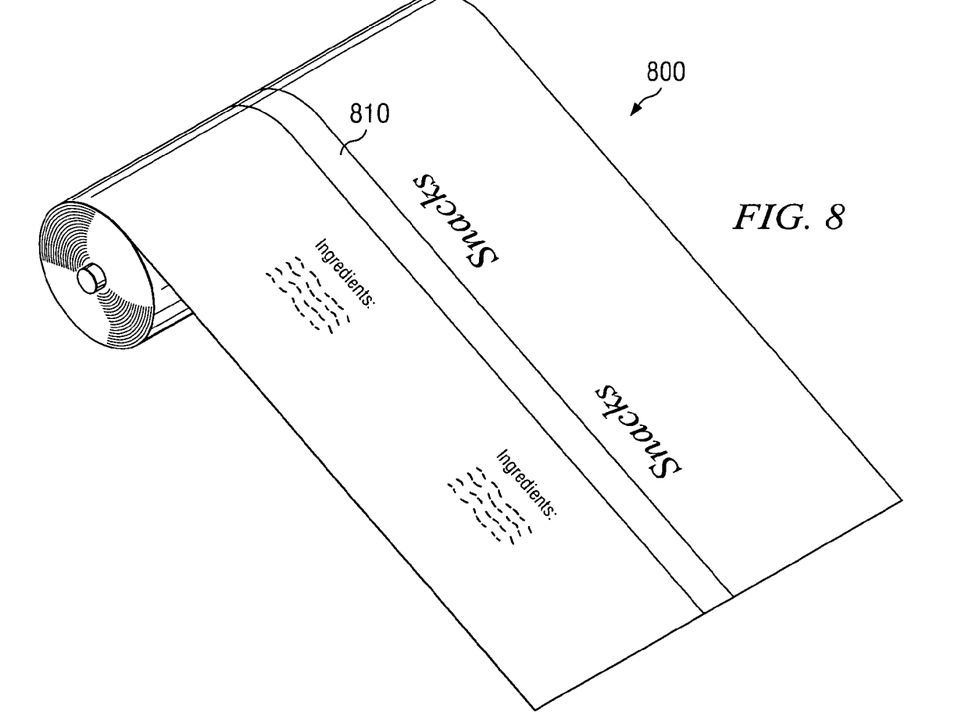

FIG. 8 shows a roll of film 800 created by the method described above in FIG. 7B and containing removable strip 810. Because of the way in which this material will be used, it is noteworthy that the graphics on this film 800 are oriented 90 degrees from the direction of travel, rather than along the direction of travel, as in FIG. 5.

Figure 9A:
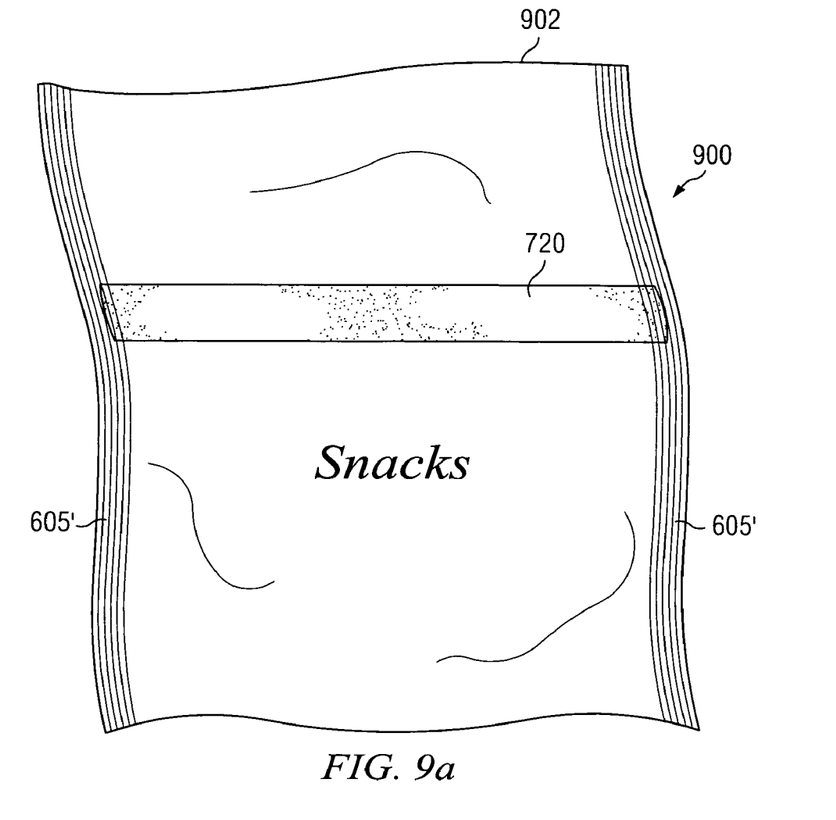
FIGS. 9a and 9b depict a package of snacks after initial opening, and illustrate a method of using the removable strip to re-close the package.
Figure 9B:
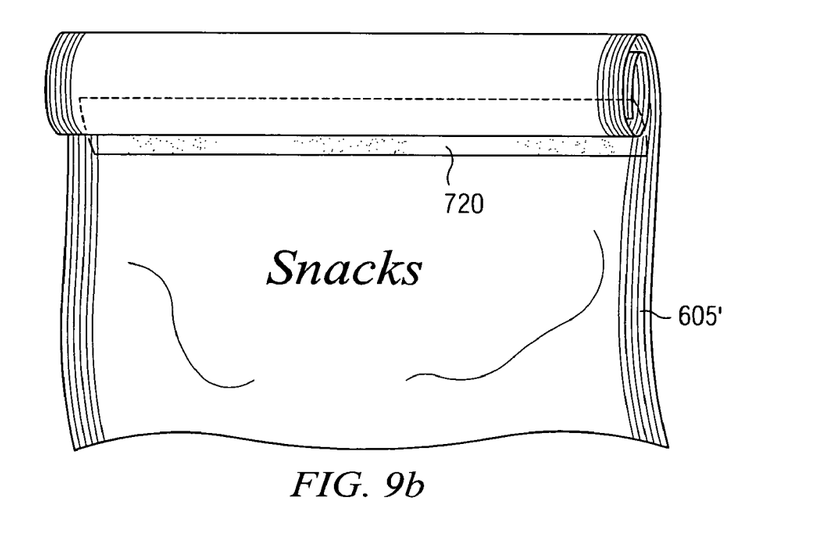

FIGS. 9A and 9B show the film of FIG. 8 made into a package and demonstrate a different use for the film to form an inexpensive reclosable bag 900. As mentioned above, the graphics for this bag 900 were oriented perpendicular to the normal direction. The bag shown is a normal pouch configuration, but turned on its side, so that the transverse seals 605' are now on the two sides of the package, rather than forming their top and bottom. This also means that the removable strip 810 runs across the bag, rather than down the bag, as in the previous embodiment. In FIG. 9A, the package has been opened and the product partially eaten, but an amount of product remains, which the user would like to keep fresh. Removable strip 810 has already been removed from the package. Because the strip 810 was coated with a release coating 728, the adhesive 720 did not peel off with the strip 810, but remained with the underlying barrier web 412, so that the adhesive 720 is visible on the bag 900. The user can then roll or fold the upper edge 902 of the package over and use the adhesive 720 on the bag to hold the top closed, as shown in FIG. 9b. This method offers an inexpensive alternative to the use of more expensive zipper closures.

Figure 9C:
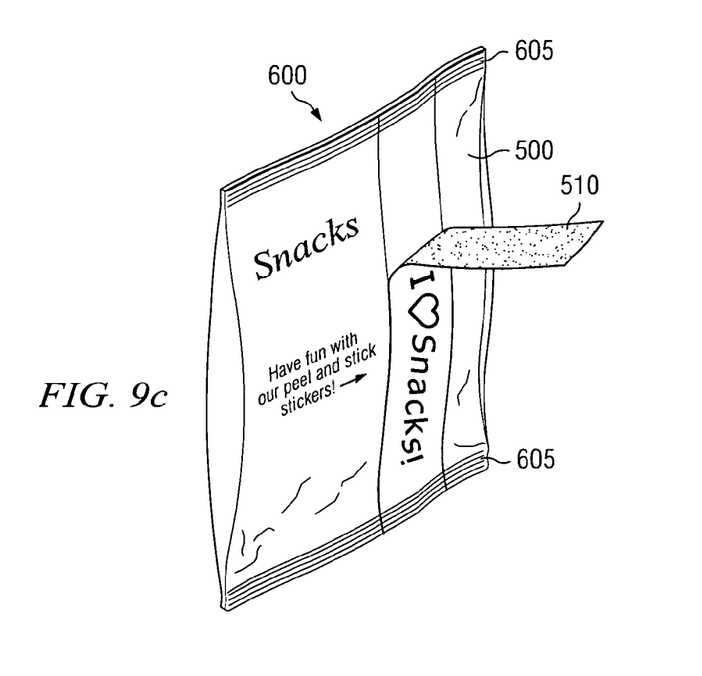
FIG. 9c depicts a package of snacks according to an alternate embodiment of the invention and illustrate using the removable strip as a sticker.

In a simple variation to this embodiment of the packaging film, shown in FIG. 9c, the release coating 728 is applied to the barrier web 412, rather than to the outer layers. In this variation, the adhesive will remain with the removable strip and can be used to provide stickers that will peel off and stick to another surface.

In summary, the invention allows the production of a flexible film having an easily removable strip incorporated therein. The removal of this strip can be done cleanly, with no damage to the underlying layers, including necessary barrier layers. Such a removable strip can be used in many innovative ways, to provide coupons, hidden graphics, stickers, and reclosable packaging. Many other variations are possible without straying from the intent of this inventive disclosure and will be obvious to one of ordinary skill in the art.

What is claimed is:

1. A method of making a flexible packaging film for a package, said method comprising the steps of:
    feeding a first flexible film comprising a graphics layer into a laminator;
    feeding a second flexible film comprising a barrier layer into a laminator;
    slitting longitudinally through said first flexible film at two laterally displaced locations to form a strip therebetween wherein said strip is completely detached from said first flexible film prior to lamination;
    providing a laminating material between said first film and said second film; and pressing said first film and said second film together to form said flexible packaging film; and forming said flexible packaging film into a package having two transverse seals;

wherein said slitting step takes place within 1–24 inches of said pressing step;

wherein said strip can be separated from the rest of said flexible packaging film without injury to other layers of said packaging film.

2. The method of claim 1, wherein said providing step comprises extruding a molten plastic layer between said first flexible film and said second flexible film.

3. The method of claim 1, wherein said providing step comprises applying an adhesive layer to said first flexible film before said film is slit.

4. The method of claim 1, further comprising the step of applying a release coating to said first flexible film in the region of said strip.

5. The method of claim 1, further comprising the step of applying a release coating to said second flexible film in the region that will be laminated to said strip.

* * * * *